United States Patent
Suwa et al.

(10) Patent No.: US 9,513,070 B2
(45) Date of Patent: Dec. 6, 2016

(54) RADIATION MEMBER

(71) Applicants: SHINKO ELECTRIC INDUSTRIES CO., LTD., Nagano (JP); SHINSHU UNIVERSITY, Nagano (JP)

(72) Inventors: Yoriyuki Suwa, Nagano (JP); Kenji Kawamura, Nagano (JP); Susumu Arai, Nagano (JP)

(73) Assignees: SHINKO ELECTRIC INDUSTRIES CO., LTD., Nagano (JP); SHINSHU UNIVERSITY, Nagano (JP)

(*) Notice: Subject to any disclaimer, the term of this patent is extended or adjusted under 35 U.S.C. 154(b) by 450 days.

(21) Appl. No.: 14/054,949

(22) Filed: Oct. 16, 2013

(65) Prior Publication Data

US 2014/0124186 A1 May 8, 2014

(30) Foreign Application Priority Data

Nov. 8, 2012 (JP) .................................. 2012-246630

(51) Int. Cl.
*F28F 21/02* (2006.01)
*F28F 21/08* (2006.01)
*B82Y 30/00* (2011.01)

(52) U.S. Cl.
CPC ............. *F28F 21/02* (2013.01); *F28F 21/089* (2013.01); *B82Y 30/00* (2013.01); *Y10S 977/742* (2013.01); *Y10S 977/932* (2013.01)

(58) Field of Classification Search
CPC ...... F28F 21/02; F28F 21/089; F28F 2255/20; B82Y 99/00; B82Y 30/00
USPC .................................. 165/185, 904; 428/600
See application file for complete search history.

(56) References Cited

U.S. PATENT DOCUMENTS

| | | | | |
|---|---|---|---|---|
| 5,150,748 | A | * 9/1992 | Blackmon | B64G 1/226 165/181 |
| 6,311,769 | B1 | * 11/2001 | Bonneville | H01L 23/3677 165/185 |
| 8,093,715 | B2 | * 1/2012 | Xu | H01L 23/373 257/720 |
| 2006/0099438 | A1 | 5/2006 | Arai et al. | |
| 2006/0234056 | A1 | * 10/2006 | Huang | H01L 23/373 428/408 |

(Continued)

FOREIGN PATENT DOCUMENTS

| | | |
|---|---|---|
| JP | 2004-156074 | 6/2004 |
| JP | 2005-089836 | 4/2005 |

(Continued)

OTHER PUBLICATIONS

Office Action mailed on Aug. 30, 2016 issued with respect to the basic Japanese Patent Application No. 2012-246630.

*Primary Examiner* — Tho V Duong
*Assistant Examiner* — Raheena Rehman
(74) *Attorney, Agent, or Firm* — IPUSA, PLLC

(57) ABSTRACT

A radiation member includes a base material; and a composite plating layer, formed on the base material, that includes a metal layer and two or more kinds of carbon materials, having different diameters from each other, dispersed in the metal layer such that to be provided with a plurality of protruding portions, each of the protruding portions being composed by a part of each of the carbon materials that are protruded from a surface of the metal layer.

2 Claims, 2 Drawing Sheets

(56) References Cited

U.S. PATENT DOCUMENTS

| | | | | |
|---|---|---|---|---|
| 2007/0244245 A1* | 10/2007 | Liu | B82Y 30/00 524/496 |
| 2008/0131655 A1* | 6/2008 | Wacker | F28F 13/185 428/119 |
| 2009/0237886 A1* | 9/2009 | Iwai | H01L 23/373 361/708 |
| 2009/0294956 A1* | 12/2009 | Lee | C04B 35/80 257/722 |
| 2010/0021736 A1* | 1/2010 | Slinker | F28F 13/00 428/408 |
| 2010/0124025 A1* | 5/2010 | Yamaguchi | H01L 23/373 361/708 |
| 2010/0181060 A1* | 7/2010 | Kobayashi | H01L 23/373 165/185 |
| 2011/0030938 A1* | 2/2011 | Liu | F28F 21/02 165/185 |
| 2011/0090650 A1* | 4/2011 | Oda | H01L 23/373 361/717 |
| 2011/0214850 A1* | 9/2011 | Lashmore | B82Y 10/00 165/185 |
| 2011/0316173 A1* | 12/2011 | Patti | B82Y 10/00 257/784 |
| 2012/0064361 A1* | 3/2012 | Suwa | B82Y 30/00 428/600 |
| 2012/0090816 A1* | 4/2012 | Bayazitoglu | B23K 26/38 165/72 |
| 2012/0090825 A1* | 4/2012 | Yarin | C25D 7/00 165/185 |
| 2012/0118551 A1* | 5/2012 | Zettl | F24J 2/07 165/185 |
| 2012/0236502 A1* | 9/2012 | Yamaguchi | H01L 23/373 361/704 |
| 2014/0034282 A1* | 2/2014 | Kawamura | F28F 3/00 165/185 |

FOREIGN PATENT DOCUMENTS

| | | |
|---|---|---|
| JP | 2006-057129 | 3/2006 |
| WO | 2005/091345 | 9/2005 |

\* cited by examiner

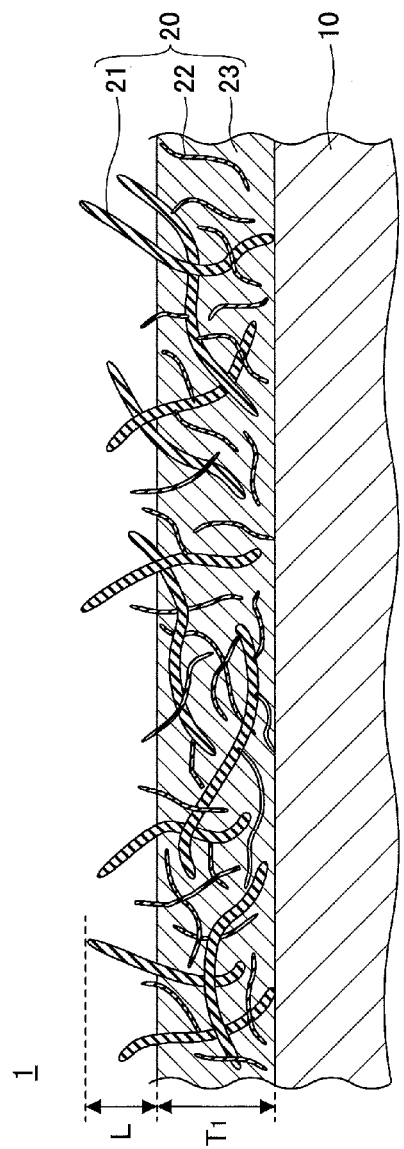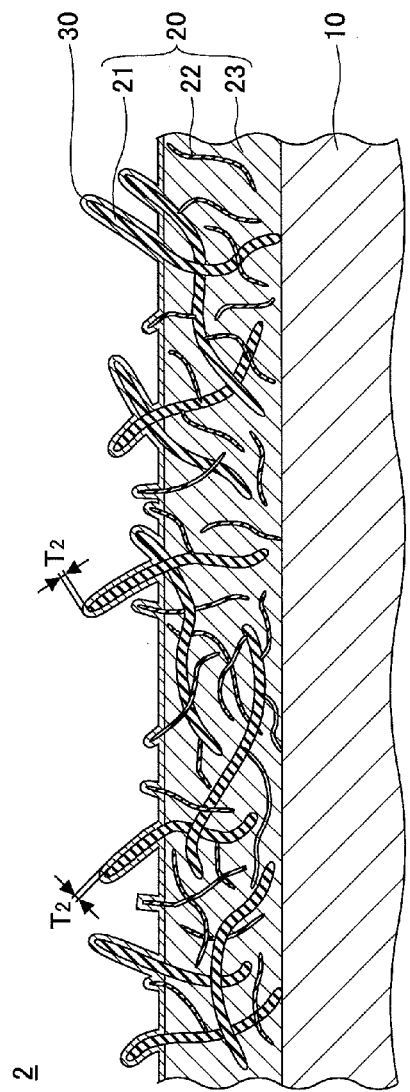
FIG.1
FIG.2

RADIATION MEMBER

CROSS-REFERENCE TO RELATED APPLICATION

The present application is based on and claims the benefit of priority of Japanese Priority Application No. 2012-246630 filed on Nov. 8, 2012, the entire contents of which are hereby incorporated by reference.

BACKGROUND OF THE INVENTION

1. Field of the Invention

The present invention relates to a radiation member that radiates heat generated by a semiconductor element or the like.

2. Description of the Related Art

Metal composites that are obtained by dispersing two or more kinds of carbon nanotubes in metal are known. Such metal composites can be manufactured, for example, by electrolyzing electrolytic solution, in which two or more kinds of carbon nanotubes are dispersed, on a cathode to precipitate metal particles that include mixtures of carbon nanotubes and separating the precipitated metal particles from the cathode.

However, according to the above method, when separating the precipitated metal particles from the cathode, the obtained metal particles are shaped after being collected, washed and dried. Thus, there has been a problem that the manufacturing process becomes complicated. Further, when precipitating the metal particles that include mixtures of nanotubes on the cathode, it is difficult to precipitate the metal particles if electrical conductivity of the metal is low. Thus, usable metal is limited. Further, as the metal composite is formed by shaping the metal particles, regarding a radiation member, it is difficult to form the metal composite at a desired portion.

Thus, it has been difficult to form a metal composite on a surface of a radiation member such as a heat spreader, a heat pipe or the like by the above described method.

PATENT DOCUMENT

[Patent Document 1] Japanese Laid-open Patent Publication No. 2006-57129

SUMMARY OF THE INVENTION

The present invention is made in light of the above problems, and provides a radiation member including a composite plating layer in which two or more kinds of carbon materials are appropriately dispersed, and a method of manufacturing the radiation member.

According to an embodiment, there is provided a radiation member including a base material; and a composite plating layer, formed on the base material, that includes a metal layer and two or more kinds of carbon materials, having different diameters from each other, dispersed in the metal layer such that to be provided with a plurality of protruding portions, each of the protruding portions being composed by a part of each of the carbon materials that are protruded from a surface of the metal layer.

According to another embodiment, there is provided a method of manufacturing a radiation member including forming, on a base material, a composite plating layer that includes a metal layer and two or more kinds of carbon materials, having different diameters from each other, dispersed in the metal layer such that to be provided with a plurality of protruding portions, each of the protruding portions being composed by a part of each of the carbon materials that are protruded from a surface of the metal layer.

Note that also arbitrary combinations of the above-described elements, and any changes of expressions in the present invention, made among methods, devices and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 1 is a partial schematic cross-sectional view illustrating an example of a radiation member of a first embodiment;

FIG. 2 is a partial schematic cross-sectional view illustrating an example of a radiation member of a second embodiment.

DETAILED DESCRIPTION OF THE PREFERRED EMBODIMENTS

Figure 3A:
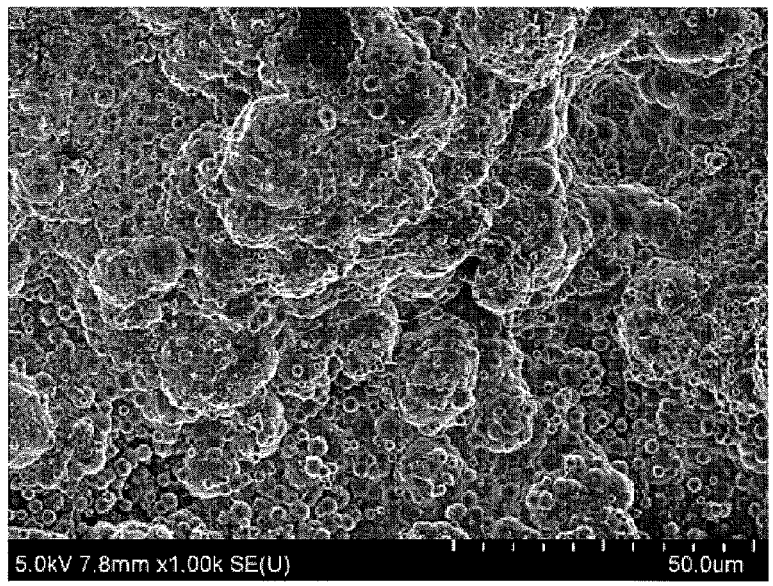
FIG. 3A and FIG. 3B are respective views illustrating a surface of a composite plating layer taken by a Scanning Electron Microscope (SEM).

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(First Embodiment)

(Structure of Radiation Member of First Embodiment)

First, a structure of a radiation member of a first embodiment is explained. FIG. 1 is a partial schematic cross-sectional view illustrating an example of a radiation member 1 of the first embodiment. The radiation member 1 includes a base material 10 and a composite plating layer 20.

The base material 10 is a portion on which the composite plating layer 20 is formed. The base material 10 may be made of metal having a good thermal conductivity. Specifically, for the base material 10, for example, copper (Cu), aluminium (Al), an alloy of these, or the like may be used. Alternatively, the base material 10 may be made of resin, silicon or the like.

The composite plating layer 20, formed on the base material 10, includes a metal layer 23 and first carbon nanotubes 21 and second carbon nanotubes 22 (hereinafter, referred to as first CNT 21 and second CNT 22, respectively) dispersed in the metal layer 23. The thickness $T_1$ of the composite plating layer 20 may be, for example about 5 to 20 μm.

A diameter of each of the first CNT 21 and a diameter of each of the second CNT 22 are different from each other. In this embodiment, the diameter of each of the first CNT 21 is larger than that of each of the second CNT 22. The diameter of each of the first CNT 21 may be, for example, about 100 to 150 nm. The diameter of each of the second CNT 22 may be, for example, about 0.8 to 20 nm.

A length of each of the first CNT 21 may be, for example, about 10 to 20 μm. A length of each of the second CNT 22 may be, for example, about 1 to 10 μm. Alternatively, the length of each of the first CNT 21 and the length of each of the second CNT 22 may be the same. The number of the first CNT 21 and the second CNT 22 may be, for example, about a few ten thousands, respectively.

The first CNT 21 and the second CNT 22 may be single walled carbon nanotubes or multi walled carbon nanotubes, respectively. Further, one of the first CNT 21 and the second CNT 22 may be single walled carbon nanotubes and the other of them may be multi walled carbon nanotubes.

Here, in one embodiment, the first CNT 21 with larger diameter may be multi walled carbon nanotubes while the second CNT 22 with smaller diameter may be single walled carbon nanotubes. With this structure, as the single walled carbon nanotubes have a thermal conductivity higher than that of the multi walled carbon nanotubes, heat radiation characteristic of the composite plating layer 20 can be further improved by dispersing a large number of the second CNT 22 with smaller diameter, that are the single walled carbon nanotubes, between the multi walls of the first CNT 21 with larger diameter.

The multi walled carbon nanotubes have a higher rigidity than the single walled carbon nanotubes and have a good linearity. Thus, by using the multi walled carbon nanotubes, each having a certain length, as the first CNT 21 with larger diameter to be dispersed in the metal layer 23, the heat of the base material 10 can be easily transmitted to the surface of the composite plating layer 20. For example, when there is a large amount of the first CNT 21, an end of each of which contacts the surface of the base material 10 and the other end of each of which protrudes from the surface of the composite plating layer 20, heat radiation characteristic of the composite plating layer 20 can be further improved.

The first CNT 21 and the second CNT 22 are aligned in random directions with respect to a surface of the base material 10 and parts of the first CNT 21 and the second CNT 22 protrude from a surface of the metal layer 23. Hereinafter, portions of the first CNT 21 and the second CNT 22, that are protruded from the surface of the metal layer 23, are referred to as protruding portions of the first CNT 21 and protruding portions of the second CNT 22, respectively.

Protruding amounts L of the protruding portions of the first CNT 21 from the surface of the metal layer 23 are different for each of the first CNT 21, but may be, for example, about 10 μm. Projecting areas of the protruding portions of the first CNT 21 with respect to the surface of the composite plating layer 20 may be more than or equal to 3%. Protruding amounts of the protruding portions of the second CNT 22 from the surface of the metal layer 23 and projecting areas of the protruding portions of the second CNT 22 may be about the same as those of the first CNT 21, respectively. Alternatively, the protruding amounts of the protruding portions of the second CNT 22 from the surface of the metal layer 23 may be smaller than that of the protruding portions of the first CNT 21 from the surface of the metal layer 23.

As the diameter of each of the second CNT 22 is smaller than that of each of the first CNT 21, it is possible for the second CNT 22 to be introduced into a space formed by the adjacent first CNT 21. Thus, density of the first CNT 21 and the second CNT 22 dispersed in the metal layer 23 can be increased. In particular, by configuring the second CNT 22 with smaller diameter to have shorter lengths than those of the first CNT 21 with larger diameter, the second CNT 22 are easily introduced into the space formed by the adjacent first CNT 21 to further increase the density.

The metal layer 23 may be made of metal having a good thermal conductivity and having a high rust resistance. Specifically, for the metal layer 23, for example, an alloy of nickel (Ni) and phosphorus (P) (Ni—P alloy) or the like may be used.

Carbon materials such as derivatives of carbon nanotubes including fluorocarbon nanotubes or the like, carbon nanofiber, graphite, carbon black or the like, or the mixture of these materials may be used instead of the first CNT 21 and the second CNT 22.

The radiation member 1 may be, for example, adapted to a vapor chamber, a heat pipe, a heat spreader, a housing of an LED or the like. It means that the base material 10 of the radiation member 1 is attached to a heat generator such as a semiconductor element or the like, and transmits the heat generated by the semiconductor element or the like to the surface of the composite plating layer 20 via the base material 10.

The first CNT 21 and the second CNT 22 whose diameters are different from each other are dispersed in the metal layer 23 with high density and parts of the first CNT 21 and the second CNT 22 are protruded from the surface of the metal layer 23. Thus, the heat transmitted from the base material 10 is immediately radiated from the protruding portions of the first CNT 21 and the second CNT 22 to improve the heat radiation characteristic of the composite plating layer 20.

Further, in this embodiment, an example is explained in which two different kinds of carbon nanotubes having different diameters are dispersed in metal (the metal layer 23). However, alternatively, three or more different kinds of carbon nanotubes having different diameters may be dispersed in metal (the metal layer 23). By dispersing a plurality of kinds of carbon nanotubes having different diameters in metal, it is possible to disperse the carbon nanotubes in the metal with a high density. Thus, heat radiation characteristic of the radiation member can be improved.

(Method of Manufacturing Radiation Member of First Embodiment)

Next, a method of manufacturing the radiation member 1 of the first embodiment is explained.

First, the base material 10 is prepared. As explained above, the base material 10 may be made of metal having a good thermal conductivity. Specifically, for the base material 10, copper (Cu), aluminium (Al), an alloy thereof or the like may be used. Alternatively, the base material 10 may be made of resin, silicon or the like.

Then, electroless plating is performed on a surface of the prepared base material 10 using plating solution including metal (23) in which the first CNT 21 and the second CNT 22 are dispersed. With this operation, the composite plating layer 20, in which the first CNT 21 and the second CNT 22 are dispersed in the metal layer 23, can be obtained. The composite plating layer 20 is formed to include the plurality of protruding portions, that are parts of the first CNT 21 and the second CNT 22, protruded from the surface of the metal layer 23.

The thickness of the composite plating layer 20 may be, for example, about 5 to 20 μm. The diameter, the length, the protruding amount, the projecting area of each of the first CNT 21 and the second CNT 22 are as described above and the explanation to which is not repeated.

For the electroless plating solution of the embodiment, for example, Ni—P plating solution may be used. Hereinafter, an example in which Ni—P plating solution is used as the electroless plating solution is explained.

Ni—P plating solution may include trimethyl-cetyl-ammonium salt, which is a cationic surface-active agent. Trimethyl-cetyl-ammonium salt may be added for an optimum amount in accordance with concentration of the first CNT 21 and the second CNT 22 in the electroless plating solution. For example, when the concentration of the first CNT 21 and the second CNT 22 is 2.0 g/l, about 0.5 to 1.0 g/l of trimethyl-cetyl-ammonium salt may be added. Trimethyl-cetyl-ammonium chloride may be used as trimethyl-cetyl-ammonium salt, for example.

When Ni—P plating solution includes trimethyl-cetyl-ammonium salt, the first CNT 21 and the second CNT 22 can be appropriately dispersed in Ni—P plating solution, which is the electroless plating solution. Trimethyl-cetyl-ammonium salt, which is the cationic surface-active agent, is positively charged in Ni—P plating solution and as it is a linear long molecule, it surrounds the first CNT 21 and the second CNT 22 well to positively charge the first CNT 21 and the second CNT 22. Then, the positively charged first CNT 21 and the second CNT 22 are strongly adsorbed on the Ni—P plating film. Further, as Ni—P plating films are stacked under this state, the first CNT 21 and the second CNT 22 can be introduced into the Ni—P plating film well.

The Ni—P plating films are stacked while one end of each of the positively charged first CNT 21 and the second CNT 22 is strongly adsorbed on the Ni—P plating films. Thus, a large amount of the first CNT 21 and the second CNT 22 are introduced into the Ni—P plating film in an oblique manner. Further, the other end of each of the first CNT 21 and the second CNT 22 protrudes from the surface of the Ni—P plating film.

As described above, according to the first embodiment, the composite plating layer 20, in which the first CNT 21 and the second CNT 22 having different diameters from each other are dispersed in the metal layer 23 and the parts of the first CNT 21 and the second CNT 22 are protruded from the surface of the metal layer 23, is formed on the base material 10. With this configuration, the heat transmitted from the base material 10 is radiated immediately from the protruding portion of each of the first CNT 21 and the second CNT 22 so that the heat radiation characteristic of the composite plating layer 20 can be improved.

According to the embodiment, the composite plating layer 20 is formed using electroless plating. By using electroless plating, the composite plating 20 layer having a constant thickness can be obtained compared with a case when electroplating is used. This is particularly an advantage to form the composite plating layer 20 on an object having a complicated shape.

Further, by using electroless plating, the composite plating layer 20 can be formed on an object without electrical conductivity. For example, even when the base material 10 is made of resin, silicon or the like, not metal, the composite plating layer 20 can be formed on the base material 10 using electroless plating. However, alternatively, the composite plating layer 20 may be formed using electroplating for a case when a required quality of the constant thickness of the film can be satisfied even when the electroplating is used, the base material 10 is made of an electrical conductive material, or the like.

(Second Embodiment)

In a second embodiment, an example is explained in which a surface plating layer is formed on the composite plating layer via a catalyst layer.

(Structure of Radiation Member of Second Embodiment)

First, a structure of a radiation member of the second embodiment is explained. FIG. 2 is a partial schematic cross-sectional view illustrating an example of a radiation member 2 of the second embodiment. The radiation member 2 is different from the radiation member 1 (see FIG. 1) of the first embodiment at a point that a surface plating layer 30 is formed on the composite plating layer 20 via a catalyst layer (not illustrated in the drawings).

The catalyst layer (not illustrated in the drawings) is formed to cover the surface of the composite plating layer 20. Specifically, the catalyst layer is formed to cover the surfaces of the protruding portions of the first CNT 21 and the second CNT 22 and the surface of the metal layer 23. The catalyst layer is made of a catalytic agent applied as a catalyst before forming the surface plating layer 30. The thickness of the catalyst layer is controlled not to fill spaces between the adjacent protruding portions.

For a material of the catalyst layer, for example, palladium (Pd) may be used. Alternatively, for a material of the catalyst layer, silver (Ag), a mixture of tin and palladium (Sn/Pd) or the like may be used. Existence of the catalyst layer gives a predetermined effect and the thickness of the catalyst layer is not particularly limited, however, the thickness of the catalyst layer may be, for example, about 10 to 40 nm.

The surface plating layer 30 is formed to cover the surface of the catalyst layer. Specifically, the surface plating layer 30 is formed to cover the surfaces of the protruding portions of the first CNT 21 and the second CNT 22 and the surface of the metal layer 23, on which the catalyst layer is formed. The surface plating layer 30 has a function to prevent dropping of the protruding portions of the first CNT 21 and the second CNT 22. When the surface plating layer 30 is formed to fill the spaces between the adjacent protruding portions of the first CNT 21 and the second CNT 22 on which the catalyst layer is formed, the heat radiation characteristic becomes lowered. Thus, the thickness of the surface plating layer 30 is controlled not to fill the spaces between the adjacent protruding portions of the first CNT 21 and the second CNT 22 on which the catalyst layer is formed.

However, the heat radiation characteristic to a certain extent can be ensured when the thickness of the surface plating layer 30 is controlled not to fill at least the spaces between the protruding portions of the first CNT 21 with larger diameter. It means that the spaces between the adjacent protruding portions of the second CNT 22 with smaller diameter may be filled with the surface plating layer 30.

The catalyst layer and the surface plating layer 30 are not necessarily constantly adhered to each of the surfaces of the protruding portions of the first CNT 21 and the second CNT 22 and the surface of the metal layer 23. For example, there may be a part where the surface plating layer 30 is directly adhered to the surfaces of the protruding portions of the first CNT 21 and the second CNT 22 and the surface of the metal layer 23 without the catalyst layer therebetween. Even if such a part exists, the surface plating layer 30 is formed to cover each of the surfaces of the protruding portions of the first CNT 21 and the second CNT 22 and the surface of the metal layer 23 on which the catalyst layer is formed as a whole. Thus, the heat radiation characteristic can be improved to a certain extent.

Here, the carbon materials such as the first CNT 21, the second CNT 22 and the like do not have a good hydrophilic function so that the adhesion with the catalyst layer may not be good. Thus, in this embodiment, the catalyst layer is formed on the surface of the composite plating layer 20 to which a predetermined surface treatment is performed to be hydrophilic. The predetermined surface treatment is explained later.

The surface plating layer 30 may be formed by electroplating, for example. For the material of the surface plating layer 30, nickel (Ni) may be used, for example. When the surface plating layer 30 is made of nickel (Ni) formed by electroplating, the thickness $T_2$ of the surface plating layer 30 may be more than or equal to 0.5 μm and less than or equal to 2 μm. By setting the thickness $T_2$ of the surface plating layer 30 to be more than or equal to 0.5 μm, dropping of the first CNT 21 and the second CNT 22 can be appropriately prevented. Meanwhile, by setting the thickness $T_2$ of the surface plating layer 30 to be less than or equal to 2 μm, the heat radiation characteristic can be retained.

Alternatively, the surface plating layer 30 may be made of copper (Cu) or silver (Ag) by electroplating. When the surface plating layer 30 is made of copper (Cu) or silver (Ag) by electroplating, the thickness $T_2$ of the surface plating layer 30 may be more than or equal to 0.5 μm and less than or equal to 2 μm. By setting the thickness $T_2$ of the surface plating layer 30 to be more than or equal to 0.5 μm, dropping of the first CNT 21 and the second CNT 22 can be appropriately prevented. Meanwhile, by setting the thickness $T_2$ of the surface plating layer 30 to be less than or equal to 2 μm, the heat radiation characteristic can be retained.

As such, by covering the protruding portions of the first CNT 21 and the second CNT 22 with the catalyst layer and the surface plating layer 30, having an extremely thin thickness, lowering of the heat radiation characteristic due to dropping of the protruding portions of the first CNT 21 and the second CNT 22 can be prevented.

(Method of Manufacturing Radiation Member of Second Embodiment)

Next, a method of manufacturing the radiation member 2 of the second embodiment is explained.

First, similar to the first embodiment, the composite plating layer 20 is formed on the base material 10, in which the first CNT 21 and the second CNT 22 are dispersed in the metal layer 23 and the parts of the first CNT 21 and the second CNT 22 are protruded from the surface of the metal layer 23.

Next, before forming the catalyst layer, a surface treatment is performed on the surface of the composite plating layer 20. By performing the surface treatment, the catalyst layer and the protruding portions of the first CNT 21 and the second CNT 22 can be appropriately adhered even when hydrophilic properties of the first CNT 21 and the second CNT 22 are not good. By performing the surface treatment on the surface of the composite plating layer 20, the protruding portions of the first CNT 21 and the second CNT 22 become hydrophilic and the adhesion with the catalyst layer can be drastically increased. For the surface treatment, for example, a surface-active agent including 2-aminoethanol and Polyoxyethylene Octylphenylether as main constituents may be used.

Then, the catalyst layer is formed on the composite plating layer 20, on which the surface treatment is performed, such that the catalyst layer covers the surfaces of the protruding portions of the first CNT 21 and the second CNT 22 and the surface of the metal layer 23. The thickness of the catalyst layer is controlled not to fill the spaces between the adjacent protruding portions, as described above. Then, the surface plating layer 30 is formed on the catalyst layer that covers the surfaces of the protruding portions of the first CNT 21 and the second CNT 22 and the surface of the metal layer 23 by electroplating, for example. The thickness of the surface plating layer 30 is controlled not to fill the spaces between the protruding portions of the first CNT 21 and the second CNT 22 on which the catalyst layer is formed, as described above. The materials and the thicknesses of the catalyst layer and the surface plating layer 30 are as described above.

Further, an acid dipping step may be provided prior to the step of forming the catalyst layer, and a step of performing a reduction treatment may be provided between the step of forming the catalyst layer and the step of forming the surface plating layer 30 (electroplating). In the acid dipping step, a surface to be plated is activated so that the catalyst layer can be easily adhered thereto. In the acid dipping step, solution including hydrochloric acid as a main constituent may be used, for example. In the step of performing the reduction treatment, the catalytic agent (the material composing the catalyst layer) applied to a surface to be plated is reduced to be metal. In the step of performing the reduction treatment, solution including sodium hypophosphite, which is a reducing agent, as a main constituent may be used, for example.

As described above, according to the second embodiment, the surface plating layer 30 is formed on the composite plating layer 20 via the catalyst layer. With this configuration, by covering the protruding portions of the first CNT 21 and the second CNT 22 with the catalyst layer and the surface plating layer 30, having an extremely thin thickness, lowering of the heat radiation characteristic due to dropping of the protruding portions of the first CNT 21 and the second CNT 22 can be prevented.

Alternatively, the surface plating layer 30 may be formed by electroless plating. In this case, Ni—P may be used as a material for the surface plating layer 30, for example. Even when the surface plating layer 30 is formed by electroless plating, the advantage as explained above can be obtained.

EXAMPLE

In this example, the radiation member 1 was manufactured in accordance with the method explained in the first embodiment. Specifically, a copper plate was used as the base material 10, and the composite plating layer 20 having a thickness of 5 μm was formed thereon by using Ni—P plating solution as the electroless plating solution. The method is explained in the following in detail.

Composition of Ni—P plating solution is as illustrated in Table 1. The diameters, lengths and densities of the first CNT 21 and the second CNT 22 are as illustrated in Table 2. As illustrated in Table 1, $1.7 \times 10^{-3}$ mol/l of trimethyl-cetyl-ammonium chloride (TMSAC) was added to Ni—P plating solution as a surface-active agent (a dispersant).

TABLE 1

| COMPOSITION | CONCENTRATION M (mol/l) |
|---|---|
| $NiSO_4 \cdot 6H_2O$ | 0.1 |
| $NaH_2PO_2 \cdot H_2O$ | 0.2 |
| $C_6H_5Na_3O_7$ | 0.2 |
| $(NH_4)_2SO_4$ | 0.5 |
| TMSAC | $1.7 \times 10^{-3}$ |

TABLE 2

|  | DIAMETER (nm) | LENGTH (μm) | CONCENTRATION (g/l) |
|---|---|---|---|
| FIRST CNT | 100~150 | 10~20 | — |
| SECOND CNT | 0.8~20 | 1~10 | — |
| FIRST CNT AND SECOND CNT | — | — | 2 |

An object to be plated (base material 10), a plating condition, and a heating condition are explained in the following.

[Base material 10]

Copper plate (3 cm×3 cm×0.3 cm)

[Pretreatment]

Normal method (sensitization+activation)

[Plating Condition]

Temperature: 40° C.

Period: 10 to 240 minutes pH: 9

Stirring: stirrer stirring (stirring speed 1500 rpm)

Figure 3B:
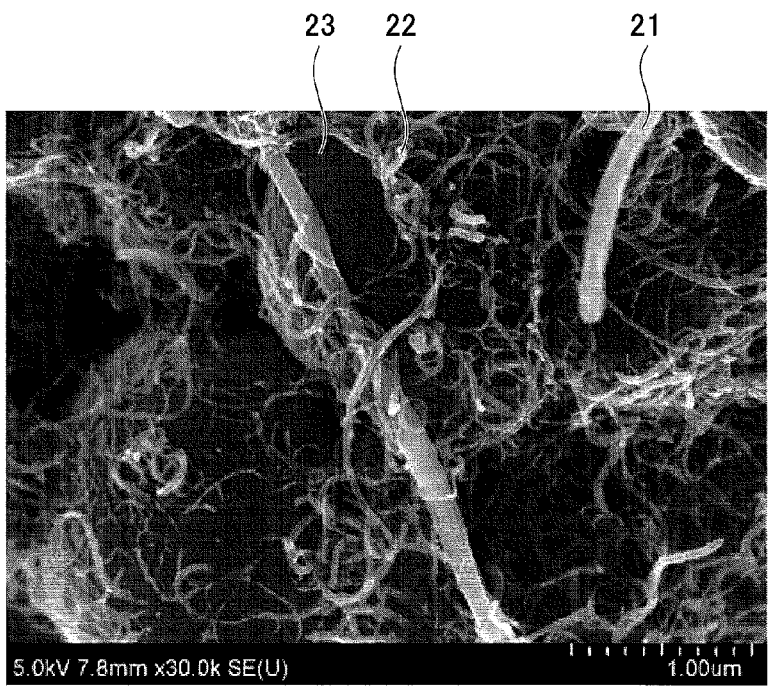

FIG. 3A and FIG. 3B are respective views illustrating the surface of the composite plating layer 20 formed on the base material 10 by the above described method taken by a Scanning Electron Microscope (SEM) (FIG. 3A illustrates low power and FIG. 3B illustrates high power). As illustrated in FIG. 3A and FIG. 3B, the first CNT 21 and the second CNT 22 are appropriately dispersed in the metal layer 23 (Ni—P plating film). Further, a large amount of the second CNT 22 with smaller diameter is introduced between the first CNT 21 with larger diameter to improve the density of the first CNT 21 and the second CNT 22 dispersed in the metal layer 23.

As such, according to the present example, it was confirmed that the first CNT 21 and the second CNT 22 having different diameters from each other are dispersed in the metal layer 23 with a high density by manufacturing the radiation member 1 according to the method of the first embodiment.

According to the embodiment, a radiation member including a composite plating layer in which two or more kinds of carbon materials are appropriately dispersed and a method of manufacturing the radiation member can be provided.

Although a preferred embodiment of the radiation member and the method of manufacturing the same has been specifically illustrated and described, it is to be understood that minor modifications may be made therein without departing from the spirit and scope of the invention as defined by the claims.

The present invention is not limited to the specifically disclosed embodiments, and numerous variations and modifications and modifications may be made without departing from the spirit and scope of the present invention.

Various aspects of the subject-matter described herein are set out non-exhaustively in the following numbered clauses:

1. A method of manufacturing a radiation member, comprising:

forming, on a base material, a composite plating layer that includes a metal layer and two or more kinds of carbon materials, having different diameters from each other, dispersed in the metal layer such that to be provided with a plurality of protruding portions, each of the protruding portions being composed by a part of each of the carbon materials that are protruded from a surface of the metal layer.

2. The method of manufacturing the radiation member according to clause 1, wherein the carbon materials include a first carbon nanotube and a second carbon nanotube having diameters different from each other.

3. The method of manufacturing the radiation member according to clause 2, wherein the second carbon nanotube has a diameter smaller than that of the first carbon nanotube and a length of the second carbon nanotube is shorter than that of the first carbon nanotube.

4. The method of manufacturing the radiation member according to clause 3, wherein the second carbon nanotube is a single walled carbon nanotube while the first carbon nanotube is a multi walled carbon nanotube.

5. The method of manufacturing the radiation member according to clause 1, wherein the composite plating layer is formed by electroless plating.

What is claimed is:

1. A radiation member comprising:

a base material; and a composite plating layer, formed on the base material, that includes a metal layer and two or more kinds of carbon materials dispersed in the metal layer such that to be provided with a plurality of protruding portions, each of the protruding portions being composed by a part of each of the carbon materials that are protruded from a surface of the metal layer, wherein the carbon materials include first carbon nanotubes and second carbon nanotubes, the second carbon nanotubes having a range of diameters that are smaller than a range of diameters of the first carbon nanotubes and the second carbon nanotubes having a range of lengths that are shorter than a range of lengths of the first carbon nanotubes.

2. The radiation member according to claim 1, wherein the second carbon nanotube is a single walled carbon nanotube while the first carbon nanotube is a multi walled carbon nanotube.

* * * * *